(12) United States Patent
Magee et al.

(10) Patent No.: US 7,382,832 B2
(45) Date of Patent: Jun. 3, 2008

(54) SCALABLE TIME-SWITCHED PREAMBLE SUPPLEMENT GENERATOR, METHOD OF GENERATING AND MULTIPLE-INPUT, MULTIPLE-OUTPUT COMMUNICATION SYSTEM EMPLOYING THE GENERATOR AND METHOD

(75) Inventors: David P. Magee, Plano, TX (US); Srinath Hosur, Plano, TX (US); Michael O. Polley, Garland, TX (US); Srikanth Gummadi, Rohnert Park, CA (US)

(73) Assignee: Texas Instruments Incorporated, Dallas, TX (US)

( * ) Notice: Subject to any disclaimer, the term of this patent is extended or adjusted under 35 U.S.C. 154(b) by 728 days.

(21) Appl. No.: 10/903,668

(22) Filed: Jul. 30, 2004

(65) Prior Publication Data

US 2006/0023804 A1 Feb. 2, 2006

(51) Int. Cl.
*H04B 7/02* (2006.01)
*H04L 1/02* (2006.01)

(52) U.S. Cl. .................. 375/267; 375/260; 375/299; 375/347; 455/515

(58) Field of Classification Search ........... 375/267, 375/260, 299, 347, 349; 455/515
See application file for complete search history.

(56) References Cited

U.S. PATENT DOCUMENTS

| | | | |
|---|---|---|---|
| 6,917,311 B2 * | 7/2005 | Hosur et al. | 341/50 |
| 7,050,768 B2 * | 5/2006 | Hosur et al. | 455/103 |
| 2004/0136464 A1 * | 7/2004 | Suh et al. | 375/260 |
| 2005/0035885 A1 * | 2/2005 | Hosur et al. | 341/50 |
| 2005/0153723 A1 * | 7/2005 | Hosur et al. | 455/515 |
| 2005/0232370 A1 * | 10/2005 | Trachewsky et al. | 375/267 |
| 2006/0008023 A1 * | 1/2006 | Magee et al. | 375/267 |
| 2006/0104380 A1 * | 5/2006 | Magee et al. | 375/267 |
| 2006/0251193 A1 * | 11/2006 | Kopmeiners et al. | 375/345 |

* cited by examiner

*Primary Examiner*—Phuong Phu
(74) *Attorney, Agent, or Firm*—Steven A. Shaw; W. James Brady; Frederick J. Telecky, Jr.

(57) ABSTRACT

The present invention provides a time-switched preamble supplement generator for use with a multiple-input, multiple-output (MIMO) transmitter employing N transmit antennas wherein N is at least two. In one embodiment, the time-switched preamble supplement generator includes an initial preamble supplement formatter configured to provide a first permutation of a set of preamble supplements to the N transmit antennas during an initial time interval. The first permutation includes a single first preamble supplement and at least one second preamble supplement. The time-switched preamble supplement generator also includes a subsequent preamble supplement formatter coupled to the initial preamble supplement formatter and configured to provide (N−1) mutually exclusive further permutations of the set to the N transmit antennas during (N−1) subsequent time intervals.

18 Claims, 6 Drawing Sheets

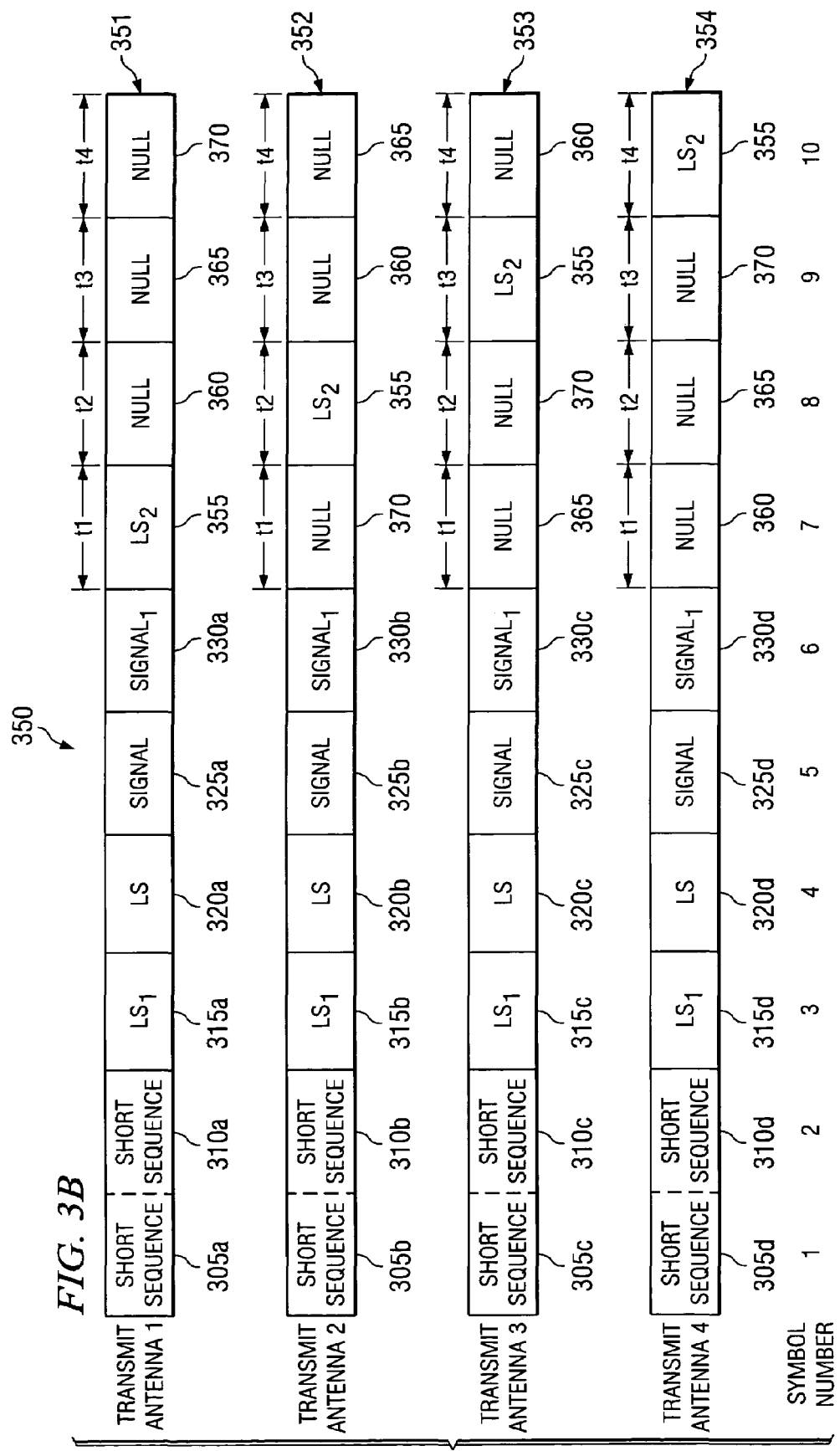

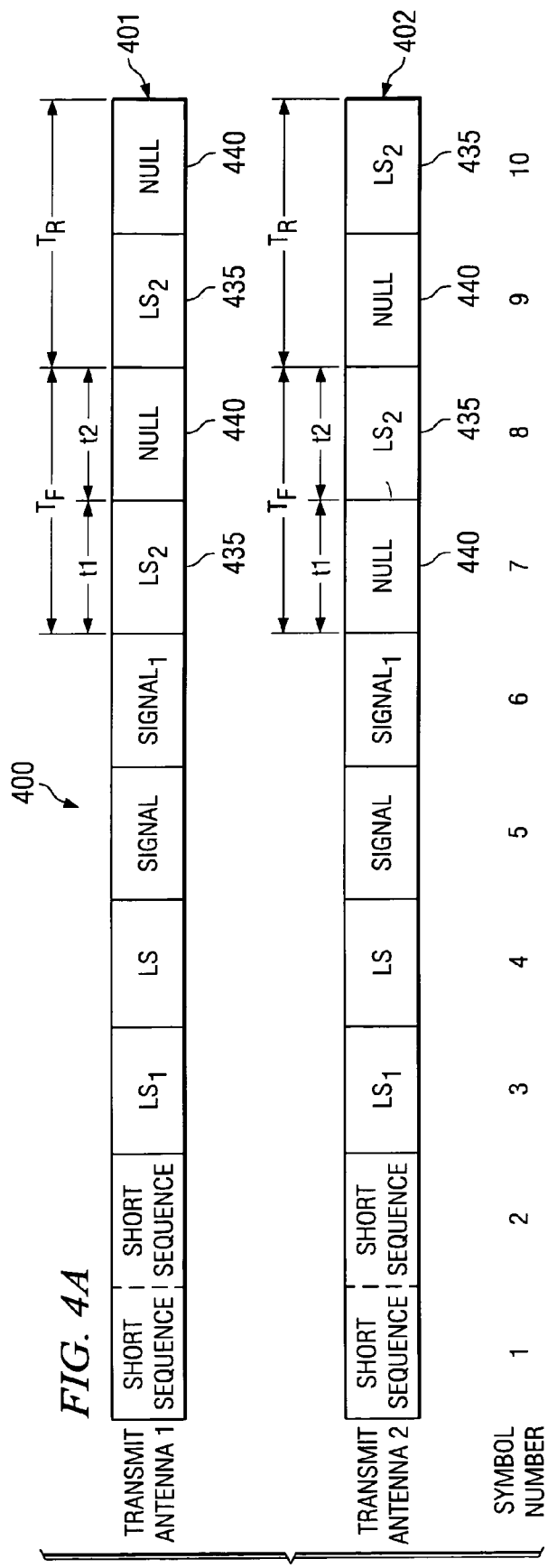

SCALABLE TIME-SWITCHED PREAMBLE SUPPLEMENT GENERATOR, METHOD OF GENERATING AND MULTIPLE-INPUT, MULTIPLE-OUTPUT COMMUNICATION SYSTEM EMPLOYING THE GENERATOR AND METHOD

TECHNICAL FIELD OF THE INVENTION

The present invention is directed, in general, to communication systems and, more specifically, to a scalable, time-switched preamble supplement generator, a method of generating the time-switched preamble supplement and a multiple-input, multiple-output (MIMO) communication system employing the generator or the method.

BACKGROUND OF THE INVENTION

Increasing the capacity and reliability of communication systems is a focus driving much of systems technology growth. Multiple-input, multiple-output (MIMO) communication systems support this growth in the development of wireless networks. MIMO communication systems have been shown to provide improvements in both capacity and reliability over single-input single-output (SISO) communication systems. These MIMO communication systems commonly employ a block structure wherein a MIMO transmitter (which is a cooperating collection of N single-dimension transmitters) sends a vector of symbol information. This symbol vector may represent one or more coded or uncoded SISO data symbols. A MIMO receiver (which is a cooperating collection of M single-dimension receivers, where M is greater than or equal to N) receives one or more copies of this transmitted vector of symbol information. The performance of the entire communication system hinges on the ability of the receiver to find reliable estimates of the symbol vector that was transmitted by the transmitter. This necessitates that the MIMO receiver provide reliable channel estimates associated with transmissions from the MIMO transmitter.

For example, a 2×2 MIMO communication system may transmit two independent and concurrent signals, employing two single-dimension transmitters having separate transmit antennas and two single-dimension receivers having separate receive antennas. Alternatively, the antennas could be derived from a single physical antenna that appropriately employs polarization. Two receive signals Y1(k), Y2(k) on the $k^{th}$ sub-carrier/tone following a Fast Fourier Transformation and assuming negligible inter-symbol interference may be written as:

$$Y1(k)=H11(k)*X1(k)+H12(k)*X2(k)+n1(k)$$

$$Y2(k)=H21(k)*X1(k)+H22(k)*X2(k)+n2(k)$$

where X1(k) and X2(k) are two independent signals transmitted on the $k^{th}$ sub-carrier/tone from the first and second transmit antennas, respectively, and n1 and n2 are noises associated with the two receive signals. The term Hij(k), where i=1,2 and j=1,2, incorporates gain and phase distortion associated with symbols transmitted on the $k^{th}$ sub-carrier/tone from transmit antenna j to receive antenna i. The channel gain and phase terms Hij(k) may also include gain and phase distortions due to signal conditioning stages such as filters and other analog electronics. The receiver is required to provide estimates of the channel values Hij (k) to reliably decode the transmitted signals X1(k) and X2(k).

In order to estimate the channel coefficients Hij(k) at the receiver, the transmitter and the receiver employ training sequences. These training sequences are predetermined and known at both the transmitter and the receiver. In an IEEE 802.11(a) compliant system, a training sequence (called a long sequence) is employed as part of a preamble to the transmission of data. This long sequence involves the transmission of a known sequence of vector symbols, employing 52 excited tones (1 or −1), an unexcited tone (0) at DC and unexcited tones at each end of the spectrum, to provide a guard interval that is used to protect data tones from pass band filter effects. An appropriate calculation of individual channel coefficients (i.e., H11(k), H12(k), H21(k), H22(k)) may typically require a processor employing complex computations. Additionally, the level of computational complexity usually increases with an increase in the number of transmit antennas.

Accordingly, what is needed in the art is a way to provide enhanced channel estimates that are less computationally complex for a MIMO communication system having a scalable number of transmit antennas.

SUMMARY OF THE INVENTION

To address the above-discussed deficiencies of the prior art, the present invention provides a time-switched preamble supplement generator for use with a multiple-input, multiple-output (MIMO) transmitter employing N transmit antennas wherein N is at least two. In one embodiment, the time-switched preamble supplement generator includes an initial preamble supplement formatter configured to provide a first permutation of a set of preamble supplements to the N transmit antennas during an initial time interval, the first permutation including a single first preamble supplement and at least one second preamble supplement. The time-switched preamble supplement generator also includes a subsequent preamble supplement formatter coupled to the initial preamble supplement formatter and configured to provide (N−1) mutually exclusive further permutations of the set to the N transmit antennas during (N−1) subsequent time intervals.

In another aspect, the present invention provides a method of generating a time-switched preamble supplement for use with a multiple-input, multiple-output (MIMO) transmitter employing N transmit antennas wherein N is at least two. The method includes providing a first permutation of a set of preamble supplements to the N transmit antennas during an initial time interval, the first permutation including a single first preamble supplement and at least one second preamble supplement. The method also includes further providing (N−1) mutually exclusive further permutations of the set to the N transmit antennas during (N−1) subsequent time intervals.

The present invention also provides, in yet another aspect, a multiple-input, multiple-output (MIMO) communications system. The MIMO communications system includes a MIMO transmitter that has N transmit antennas, where N is at least two, and a time-switched preamble supplement generator coupled to the MIMO transmitter. The time-switched preamble supplement generator has an initial preamble supplement formatter that provides a first permutation of a set of preamble supplements to the N transmit antennas during an initial time interval, the first permutation including a single first preamble supplement and at least one second preamble supplement. The time-switched preamble supplement generator also has a subsequent preamble supplement formatter, coupled to the initial preamble supplement formatter, that provides (N−1) mutually exclusive further permutations of the set to the N transmit antennas during (N−1) subsequent time intervals. The MIMO communications system also includes a MIMO receiver that has M receive antennas and employs the set and the permutations of the set to determine channel estimates.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIGS. 3A and 3B illustrate diagrams of alternative embodiments of transmission frame formats employable with a time-switched preamble generator and constructed in accordance with the principles of the present invention;

FIGS. 4A and 4B illustrate diagrams of additional alternative embodiments of transmission frame formats employable with a time-switched preamble generator and constructed in accordance with the principles of the present invention.

DETAILED DESCRIPTION

Figure 1:
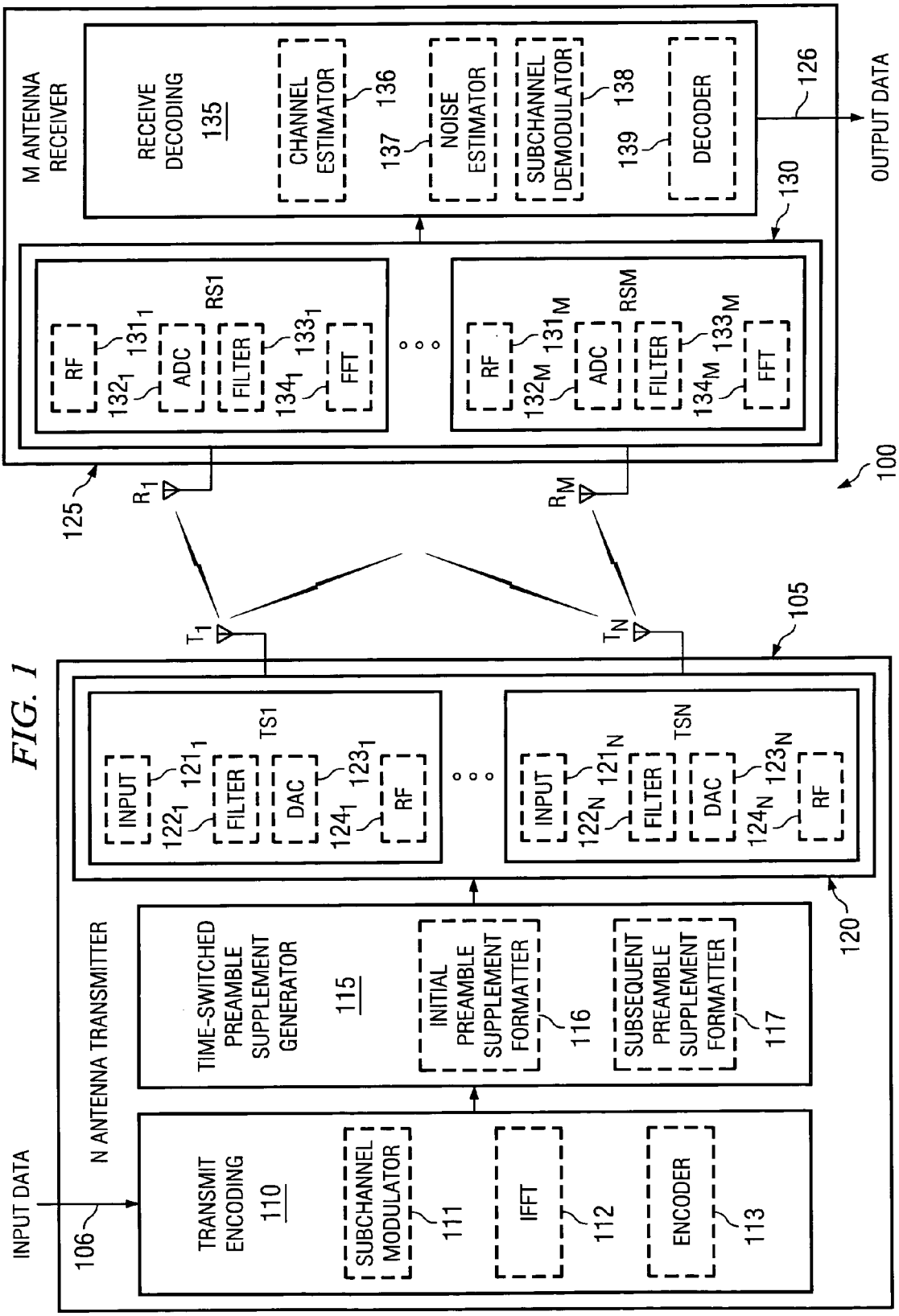
FIG. 1 illustrates a system diagram of an embodiment of an N×M MIMO communication system constructed in accordance with the principles of the present invention.

Referring initially to FIG. 1, illustrated is a system diagram of an embodiment of an N×M MIMO communication system, generally designated 100, constructed in accordance with the principles of the present invention. The MIMO communication system 100 includes a MIMO transmitter 105 and a MIMO receiver 125. The MIMO transmitter 105 includes input data 106, a transmit encoding system 110, a time-switched preamble supplement generator 115 and a transmit system 120 having N transmit sections TS1-TSN coupled to N transmit antennas T1-TN, respectively. The receiver 125 includes a receive system 130 having M receive sections RS1-RSM respectively coupled to M receive antennas R1-RM, and a receive decoding system 135 providing output data 126. In the illustrated embodiment, N and M are at least two.

The transmit encoding system 110 includes a subchannel modulator 111, an Inverse Fast Fourier Transform (IFFT) section 112 and an encoder 113. The subchannel modulator 111, IFFT section 112 and encoder 113 prepare the input data and support the arrangement of preamble information and signal information for transmission by the transmit system 120. The time-switched preamble supplement generator 115 includes an initial preamble supplement formatter 116 and a subsequent preamble supplement formatter 117, which cooperate with the encoder 113, to generate a preamble so that the receiver 125 can estimate a communication channel needed to process the transmission. Additionally, the initial and subsequent preamble supplement formatters 116, 117 may be employed in either the frequency or time domain. For the time domain, an IFFT of the appropriate preamble information may be pre-computed and read from memory at the required transmission time.

The N transmit sections TS1-TSN include corresponding pluralities of N input sections $121_1$-$121_N$, N filters $122_1$-$122_N$, N digital-to-analog converters (DACs) N $123_1$-$123_N$ and N radio frequency (RF) sections $124_1$-$124_N$, respectively. The N transmit sections TS1-TSN provide a time domain signal proportional to preamble information, signal information and input data for transmission by the N transmit antennas T1-TN, respectively.

The M receive antennas R1-RM receive the transmission and provide it to the respective M receive sections RS1-RSM, which include corresponding M RF sections $131_1$-$131_M$, M analog-to-digital converters (ADCs) $132_1$-$132_M$, M filters $133_1$-$133_M$, and M Fast Fourier Transform (FFT) sections $134_1$-$134_M$, respectively. The M receive sections RS1-RSM provide a frequency domain digital signal, proportional to the preamble information, signal information and input data, to the receive decoding system 135. The receive decoding system 135 includes a channel estimator 136, a noise estimator 137, a subchannel demodulator 138 and a decoder 139 that employ the preamble information, signal information and input data to provide the output data 126. In the illustrated embodiment, the channel estimator 136 employs the preamble information for the purpose of estimating the communications channel.

In the time-switched preamble supplement generator 115 the initial preamble supplement formatter 116 provides a first permutation of a set of preamble supplements to the N transmit antennas during an initial time interval. The first permutation includes a single first preamble supplement and at least one second preamble supplement. The subsequent preamble supplement formatter 117 is coupled to the initial preamble supplement formatter 116 and provides (N−1) mutually exclusive further permutations of the set to the N transmit antennas during (N−1) subsequent time intervals.

In the illustrated embodiment, the first preamble supplement is a known training sequence and the second preamble supplement is a null. Appropriately time-switching permutations of the training sequence and one or more nulls (depending on the value N) between the N transmit antennas facilitates the calculation of needed channel estimates in the N×N receiver 125. The initial time interval and the (N−1) subsequent time intervals are contiguous and based on the number N. The set of preamble supplements may be repeated during one or more additional periods of time. Each of the additional periods of time is based on an integer multiple of the N transmit antennas, and they are also typically contiguous. The set of preamble supplements may temporally follow a signal field, such as one appropriate to IEEE 802.11(a). The scalable property of the time-switched preamble supplement generator 115 allows it to accommodate MIMO transmitters employing two or more transmit antennas. This property allows an associated MIMO receiver having M receive antennas to more effectively calculate individual channel estimates. Providing time-switched preamble supplements for additional periods of time accommodates scaling in the time dimension, as well. This allows the preamble supplements to be averaged, which may further provide additional enhancement for channel estimation.

Those skilled in the pertinent art will understand that the present invention can be applied to conventional or future-discovered MIMO communication systems. For example, these systems may form a part of a narrowband wireless communication system employing multiple antennas, a broadband communication system employing time division multiple access (TDMA) or a general multiuser communication system.

Figure 2:
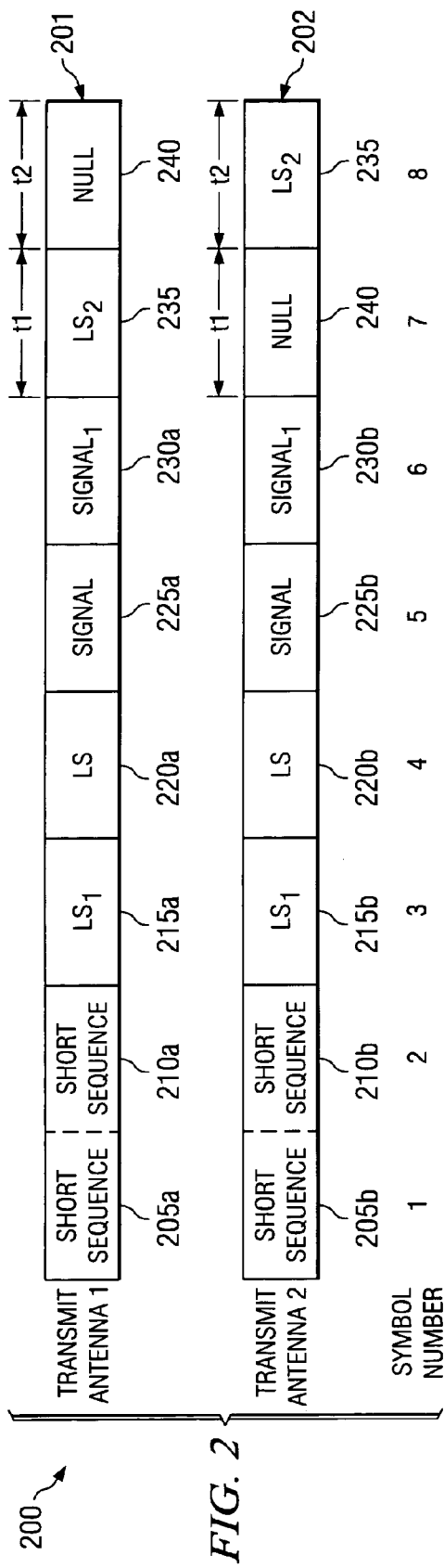
FIG. 2 illustrates a diagram of an embodiment of a transmission frame format employable with a time-switched preamble supplement generator and constructed in accordance with the principles of the present invention.

Turning now to FIG. 2, illustrated is a diagram of an embodiment of a transmission frame format, generally designated 200, employable with a time-switched preamble supplement generator and constructed in accordance with the principles of the present invention. The transmission frame format 200 may be employed with a MIMO transmitter having first and second transmit antennas, as was generally discussed with respect to FIG. 1 wherein N is equal to two. The transmission frame format 200 includes first and second transmission frames 201, 202 associated with the first and second transmit antennas, respectively.

The first and second transmission frames 201, 202 employ several standard fields that are common to both. These include standard short sequence fields 205a, 205b, 210a, 210b, standard long sequence fields 215a, 215b, 220a, 220b, standard signal fields 225a, 225b, and potential MIMO signal fields 230a, 235b during symbol bursts 1-6, respectively. During an initial time interval t1, a first permutation of a set of preamble supplements is employed wherein the first transmission frame 201 includes a first preamble supplement 235 that is a training sequence $LS_2$, and the second transmission frame 202 includes a second preamble supplement 240 that is an initial null Øi. During a subsequent time interval t2, a mutually exclusive further permutation of the set is employed wherein the first transmission frame 201 includes the second preamble supplement 240 that is a subsequent null Øs, and the second transmission frame 202 employs the first preamble supplement 235 that is the training sequence $LS_2$, as shown.

In the illustrated embodiment, the initial and subsequent nulls Øi, Øs are substantially equal in their effect although they may employ differing null formats. For example, the initial or subsequent null Øi, Øs may be zero functions that by definition are zero almost everywhere, or null sequences of numerical values that converge to zero. Alternatively, the initial and subsequent nulls Øi, Øs may be an un-modulated transmission or a transmission employing substantially zero modulation. Of course, the null format of each of the initial and subsequent nulls Øi, Øs may be other current or future-developed formats, as advantageously required by a particular application.

With reference to FIG. 1 for the illustrated embodiment of FIG. 2, the initial time interval t1 corresponds to symbol burst 7 and the subsequent time interval t2 corresponds to symbol burst 8. Then, first and second receive signals $Y_m[k,7]$, $Y_m[k,8]$ on first and second receive antennas may be written generally as:

$$Y_m[k,7]=H_{m1}[k,7]LS_2+n_m[k,7] \quad (1a)$$

$$Y_m[k,8]=H_{m2}[k,8]LS_2+n_m[k,8] \quad (1b)$$

where m denotes the receive path, k denotes the $k^{th}$ sub-carrier/tone index, and $n_m[k,7]$, $n_m[k,8]$ are associated noise terms. If the associated noise terms $n_m[k,7]$, $n_m[k,8]$ may be neglected, the general first and second receive signals simplify to:

$$Y_1[k,7]=H_{11}[k,7]LS_2 \quad (1c)$$

$$Y_2[k,7]=H_{21}[k,7]LS_2 \quad (1d)$$

$$Y_1[k,8]=H_{12}[k,8]LS_2 \quad (1e)$$

$$Y_2[k,8]=H_{22}[k,8]LS_2 \quad (1f)$$

since the initial and subsequent nulls Øi, Øs effectively reduce all other terms to negligible quantities. Assuming that the channel is constant, the channel estimates $\hat{H}_{m1}[k]$, $\hat{H}_{m2}[k]$ may be easily determined by dividing the receive signals $Y_m[k,7]$, $Y_m[k,8]$ by the training sequence $LS_2$, since it is a known quantity.

As may be seen in FIG. 2, the initial and subsequent time intervals t1, t2 are contiguous. However, alternative embodiments separate the initial time interval t1 and the subsequent time interval t2 as appropriate to a particular application. Additionally, the employment of standard preamble fields allows the maintenance of backward compatibility with IEEE 802.11(a) compliant transmitters in embodiments of the present invention.

Figure 3A:
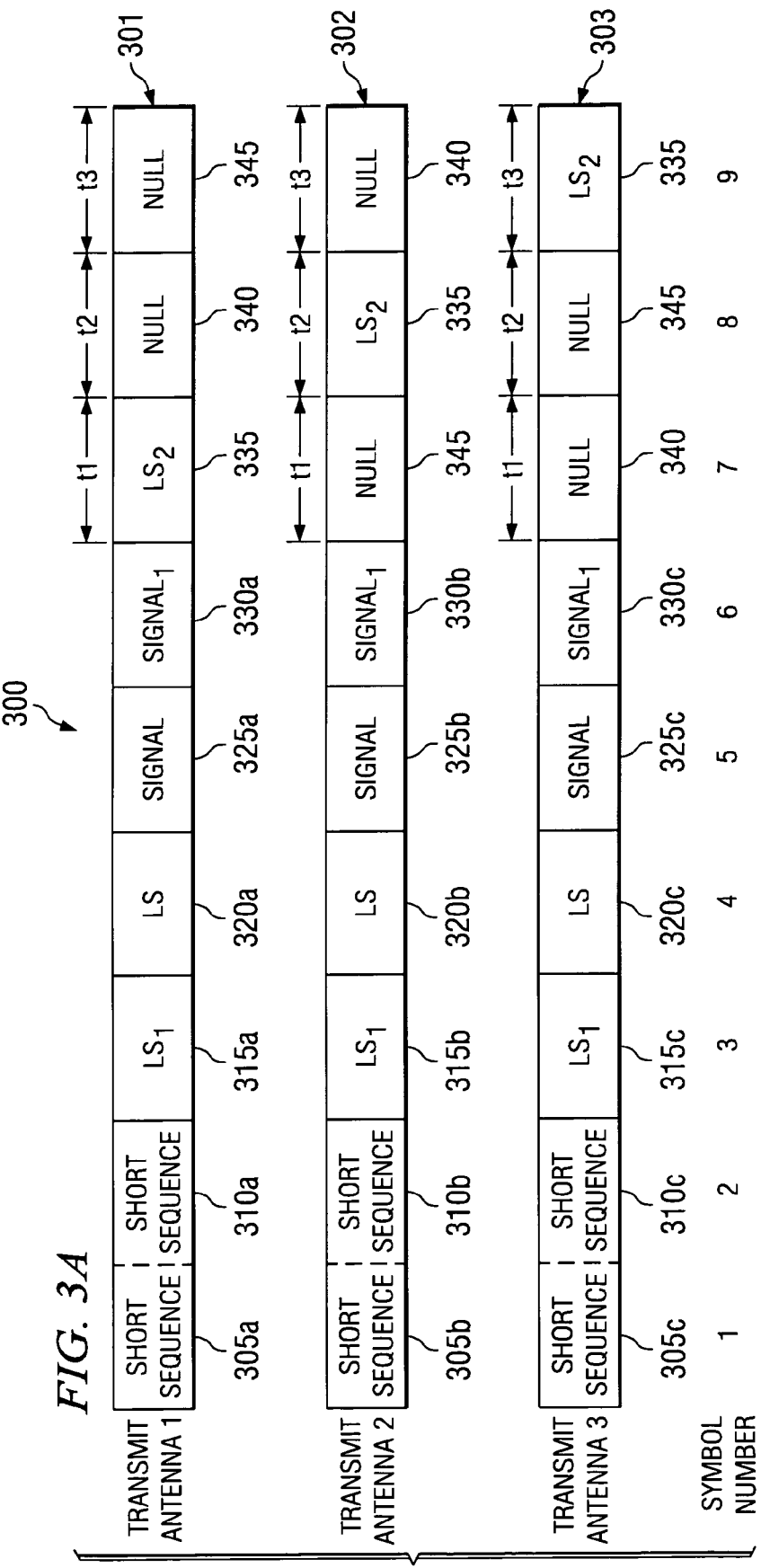

Turning now to FIGS. 3A and 3B, illustrated are diagrams of alternative embodiments of transmission frame formats, generally designated 300 and 350, employable with a time-switched preamble generator and constructed in accordance with the principles of the present invention. In FIG. 3A, the transmission frame format 300 may be employed with a MIMO transmitter having first, second and third transmit antennas, as was generally discussed with respect to FIG. 1 wherein N is equal to three. The transmission frame format 300 includes first, second and third transmission frames 301, 302, 303 associated with the first, second and third transmit antennas, respectively.

Parallel to the previous discussion with respect to FIG. 2, the first and second transmission frames 301, 302 employ several standard fields that are common to both. These include standard short sequence fields 305a, 305b, 310a, 310b, standard long sequence fields 315a, 315b, 320a, 320b, standard signal fields 325a, 325b, and potential signal fields 330a, 330b during symbol bursts 1-6, respectively. Additionally, the third transmission frame 303 may employ additional standard short sequence fields 305c, 310c, standard long sequence fields 315c, 320c, and standard signal fields 325c, 330c during symbol bursts 1-6, respectively.

During an initial time interval t1, a first permutation of a set of preamble supplements is employed wherein the first transmission frame 301 includes a first preamble supplement 335 that is a training sequence $LS_2$, the second transmission frame 302 includes a second preamble supplement 340 that is a first initial null Øi1 and the third transmission frame 303 includes a third preamble supplement 345 that is a second initial null Øi2. During a first subsequent time interval t2, a mutually exclusive further permutation of the set is employed wherein the first transmission frame 301 includes a first subsequent null Øs1, the second transmission frame 302 includes the training sequence $LS_2$, and the third transmission frame 303 includes a second subsequent null ØS2.

Similarly, during a second subsequent time interval t3, an additional mutually exclusive further permutation of the set is employed wherein the first transmission frame 301 includes the second subsequent null ØS2, the second transmission frame 302 includes the first subsequent null Øs1 and the third transmission frame 303 includes the training sequence $LS_2$. In the illustrated embodiment of FIG. 3A, the initial and subsequent nulls are again substantially equal in their effect and typically may employ the same or differing null formats.

With reference to FIG. 1 for the illustrated embodiment of FIG. 3A, the initial time interval t1 corresponds to symbol burst 7, the first subsequent time interval t2 corresponds to symbol burst 8 and the second subsequent time interval t3 corresponds to symbol burst 9. Then, first, second and third receive signals $Y_m[k,7]$, $Y_m[k,8]$, $Y_m[k,9]$ on first, second and third receive antennas may be written generally as:

$$Y_m[k,7]=H_{m1}[k,7]LS_2+n_m[k,7] \quad (2a)$$

$$Y_m[k,8]=H_{m2}[k,8]LS_2+n_m[k,8] \quad (2b)$$

$$Y_m[k,9]=H_{m3}[k,9]LS_2+n_m[k,9] \quad (2c)$$

where again, m denotes the receive path, k denotes the $k^{th}$ sub-carrier/tone index, and $n_m[k,7]$, $n_m[k,8]$, $n_m[k,9]$ are associated noise terms. Assuming that the channel is constant, the channel estimates $\hat{H}_{m1}[k]$, $\hat{H}_{m2}[k]$, $\hat{H}_{m3}[k]$ may be determined by dividing the receive signals $Y_m[k,7]$, $Y_m[k,8]$, $Y_m[k,9]$ by the training sequence $LS_2$, if the associated noise terms $n_m[k,7]$, $n_m[k,8]$, $n_m[k,9]$ may be neglected.

In FIG. 3B, the transmission frame format 350 may be employed with a MIMO transmitter having first, second, third and fourth transmit antennas, as was generally discussed with respect to FIG. 1, wherein N is equal to four. The transmission frame format 350 includes first, second, third and fourth transmission frames 351, 352, 353, 354 associated with the first, second, third and fourth transmit antennas, respectively.

Again, as previously discussion with respect to FIG. 3A, the first, second and third transmission frames 351, 352, 353 employ several standard fields that are common to FIG. 3A. The fourth transmission frame 354 may employ additional standard short sequence fields 305d, 310d, standard long sequence fields 315d, 320d, a standard signal field 325d, and a potential MIMO signal field 330d, during symbol bursts 1-6, respectively.

As discussed with respect to FIGS. 2 and 3A, a first permutation of a set of preamble supplements is employed during an initial time interval t1. The first permutation of the set of preamble supplements employs a first preamble supplement 355 that is a training sequence $LS_2$ in the first transmission frame 351, and second preamble supplements 360, 365, 370 that are nulls Ø in the second, third and fourth transmission frames 352, 353, 354, as shown. During a first subsequent time interval t2, a mutually exclusive further permutation of the set is employed wherein the second transmission frame 352 includes the training sequence $LS_2$, and each of the first, third and fourth transmission frames 351, 353, 354 includes the null Ø.

During a second subsequent time interval t3, another mutually exclusive further permutation of the set is employed wherein the third transmission frame 353 includes the training sequence $LS_2$, and each of the first, second and fourth transmission frames 351, 352, 354 includes the null Ø. Finally, during a third subsequent time interval t4, yet another mutually exclusive further permutation of the set is employed wherein the fourth transmission frame 354 includes the training sequence $LS_2$, and each of the first, second and third transmission frames 351, 352, 353 includes the null Ø. It may be understood that the permutations presented during each of the initial and subsequent time intervals are exemplary and could be appropriately rearranged between time intervals without affecting the efficacy of the embodiments shown.

Again with reference to FIG. 1 for the illustrated embodiment of FIG. 3B, the initial time interval t1 corresponds to symbol burst 7, the first subsequent time interval t2 corresponds to symbol burst 8, the second subsequent time interval t3 corresponds to symbol burst 9 and the third subsequent time interval t4 corresponds to symbol burst 10. Then, first, second, third and fourth receive signals $Y_m[k,7]$, $Y_m[k,8]$, $Y_m[k,9]$, $Y_m[k,10]$ on first, second, third and fourth receive antennas may be written generally as:

$$Y_m[k,7]=H_{m1}[k,7]LS_2+n_m[k,7] \quad (3a)$$

$$Y_m[k,8]=H_{m2}[k,8]LS_2+n_m[k,8] \quad (3b)$$

$$Y_m[k,9]=H_{m3}[k,9]LS_2+n_m[k,9] \quad (3c)$$

$$Y_m[k,10]=H_{m4}[k,10]LS_2+n_m[k,10] \quad (3d)$$

where again, m denotes the receive path, k denotes the $k^{th}$ sub-carrier/tone index, and $n_m[k,7]$, $n_m[k,8]$, $n_m[k,9]$, $n_m[k,10]$ are associated noise terms. Again, assuming that the channel is constant, the channel estimates $\hat{H}_{m1}[k]$, $\hat{H}_{m2}[k]$, $\hat{H}_{m3}[k]$, $\hat{H}_{m4}[k]$ may be again determined by dividing the receive signals $Y_m[k,7]$, $Y_m[k,8]$, $Y_m[k,9]$, $Y_m[k,10]$ by the training sequence $LS_2$, if the associated noise terms $n_m[k,7]$, $n_m[k,8]$, $n_m[k,9]$, $n_m[k,10]$ may be neglected.

Figure 4B:
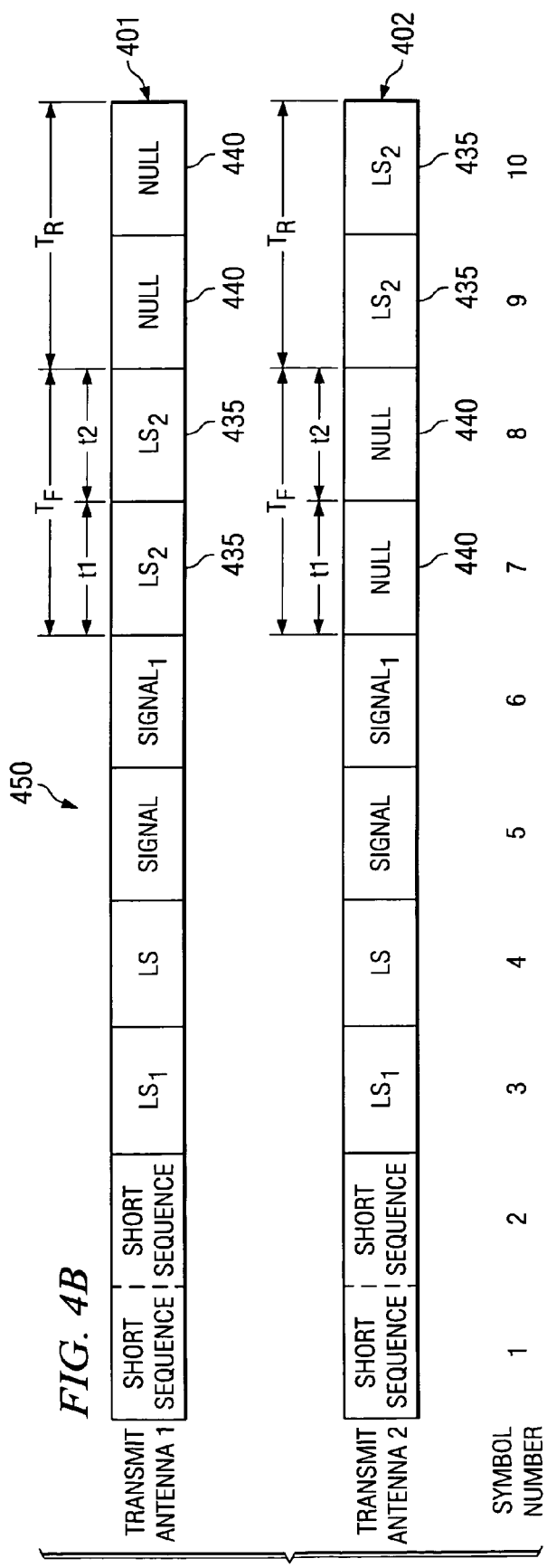

Turning now to FIGS. 4A and 4B, illustrated are diagrams of additional alternative embodiments of transmission frame formats, generally designated 400 and 450, employable with a time-switched preamble generator and constructed in accordance with the principles of the present invention. In FIGS. 4A and 4B, the transmission frame formats 400 and 450 may be employed with a MIMO transmitter having first and second transmit antennas, as was generally discussed with respect to FIG. 1 for N equal to two and specifically discussed with respect to FIG. 2. The transmission frame formats 400, 450 includes first and second transmission frames 401, 402 associated with the first and second transmit antennas, respectively.

In FIG. 4A, permutations of the set of first and second preamble supplements that were shown in FIG. 2 are employed during a first time period $T_F$. This pattern of permutations includes a first preamble supplement 435 that is a training sequence $LS_2$, and a second preamble supplement 440 that is a null Ø during an initial time interval t1, wherein this arrangement is reversed during a subsequent time interval t2 to complete the permutations pattern. Then the permutation pattern is repeated during an additional time period $T_R$. In FIG. 4B, another repeated provision of the first and second preamble supplements 435, 440 during the first and additional time periods $T_F$, $T_R$ is shown.

The repeated provision of the first and second preamble supplements 435, 440 allows the preambles to be averaged over time, thereby providing the opportunity for more effective channel estimates. It should be understood that the additional time period $T_R$ should be an integer multiple of the N transmit antennas employed. Although only one additional period of time is employed in the illustrated embodiments, as many additional time periods as appropriate to a particular application may be used.

Figure 5:
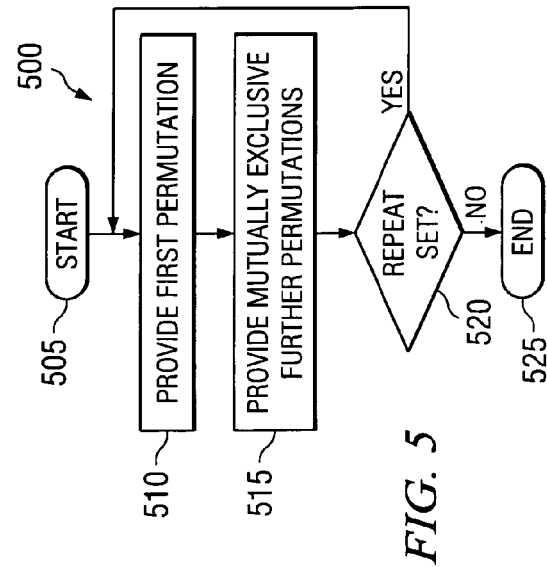
FIG. 5 illustrates a flow diagram of a method of generating a time-switched preamble supplement carried out in accordance with the principles of the present invention.

Turning now to FIG. 5, illustrated is a flow diagram of a method of generating a time-switched preamble supplement, generally designated 500, carried out in accordance with the principles of the present invention. The method may be employed with a MIMO transmitter having N transmit antennas, where N is two or greater, and starts in a step 505. In a step 510, a first permutation of a set of preamble supplements, including at least a single first preamble supplement and at least one second preamble supplement, are provided to the N transmit antennas during an initial time interval. Either the first preamble supplement or the second preamble supplement may employ a null while the other typically employs a training sequence.

Then, in a step 515, (N−1) mutually exclusive further permutations of the set of preamble supplements are further provided to the N transmit antennas during (N−1) subsequent time intervals. A decisional step 520 determines if the set of preamble supplements is to be repeated in one or more additional time periods wherein each period employs an initial and (N−1) subsequent time intervals. The length of each additional time period is an integer multiple of the N transmit antennas employed. If an additional time period is employed, the method 500 returns to the step 510 and steps 510, 515 are repeated for the required number of additional time periods. When this requirement is met or if an additional time period is not required in the decisional step 520, the method 500 ends in a step 525.

While the method disclosed herein has been described and shown with reference to particular steps performed in a particular order, those skilled in the pertinent art will understand that these steps may be combined, subdivided, or reordered to form an equivalent method without departing from the teachings of the present invention. Accordingly, unless specifically indicated herein, the order and/or the grouping of the steps are not limitations of the present invention.

In summary, embodiments of the present invention employing a time-switched preamble supplement generator, a method of generating a time-switched preamble supplement and a MIMO communication system employing the generator or the method have been presented. Advantages include the important property that the generator and method are readily scalable to accommodate MIMO transmitters having N transmit antennas, where N may be two or greater. This property allows an associated MIMO receiver having M receive antennas to more effectively calculate individual channel estimates. The channel estimates may be further enhanced by employing additional time periods that allow scaling in the time dimension, as well. Supplying time-switched preamble supplements for additional time periods allows the preamble supplements to be averaged thereby providing for additional channel estimation enhancement.

Although the present invention has been described in detail, those skilled in the art should understand that they can make various changes, substitutions and alterations herein without departing from the spirit and scope of the invention in its broadest form.

What is claimed is:

1. A time-switched preamble supplement generator for use with a multiple-input, multiple-output (MIMO) transmitter employing N transmit antennas, N being at least two, comprising:
   an initial preamble supplement formatter configured to provide a first permutation of a set of preamble supplements to said N transmit antennas during an initial time interval, said first permutation including a single first preamble supplement and at least one second preamble supplement; and
   a subsequent preamble supplement formatter coupled to said initial preamble supplement formatter and configured to provide (N−1) mutually exclusive further permutations of said set to said N transmit antennas during (N−1) subsequent time intervals, wherein said initial preamble supplement formatter and said subsequent preamble supplement formatter repeatedly provide said first permutation and said mutually exclusive further permutations during an additional period of time.

2. The generator as recited in claim 1 wherein said first preamble supplement is a training sequence and said second preamble supplement is a null.

3. The generator as recited in claim 1 wherein said set temporally follows a signal field.

4. The generator as recited in claim 1 wherein said initial time interval and said subsequent time intervals are contiguous.

5. The generator as recited in claim 1 wherein repeated provisions of said initial permutation and said mutually exclusive further permutations allow said first permutation and said mutually exclusive further permutations to be averaged.

6. The generator as recited in claim 1 wherein said additional period of time is based on an integer multiple of said plurality of N transmit antennas.

7. A method of generating a time-switched preamble supplement for use with a multiple-input, multiple-output (MIMO) transmitter employing N transmit antennas, N being at least two, comprising:
   providing a first permutation of a set of preamble supplements to said N transmit antennas during an initial time interval, said first permutation including a single first preamble supplement and at least one second preamble supplement; and
   further providing (N−1) mutually exclusive further permutations of said set to said N transmit antennas during (N−1) subsequent time intervals, wherein said first permutation and said mutually exclusive further permutations are repeatedly provided during an additional period of time.

8. The method as recited in claim 7 wherein said first preamble supplement is a training sequence and said second preamble supplement is a null.

9. The method as recited in claim 7 wherein said set temporally follows a signal field.

10. The method as recited in claim 7 wherein said initial time interval and said subsequent time intervals are contiguous.

11. The method as recited in claim 7 wherein repeated provisions of said initial permutation and said mutually exclusive further permutations allow said first permutation and said mutually exclusive further permutations to be averaged.

12. The method as recited in claim 7 wherein said additional period of time is based on an integer multiple of said plurality of N transmit antennas.

13. A multiple-input, multiple-output (MIMO) communications system, comprising:
   a MIMO transmitter that has N transmit antennas, N being at least two;
   a time-switched preamble supplement generator coupled to said MIMO transmitter and including:
      an initial preamble supplement formatter that provides a first permutation of a set of preamble supplements to said N transmit antennas during an initial time interval, said first permutation including a single first preamble supplement and at least one second preamble supplement, and
      a subsequent preamble supplement formatter, coupled to said initial preamble supplement formatter, that provides (N−1) mutually exclusive further permutations of said set to said N transmit antennas during (N−1) subsequent time intervals, wherein said initial preamble supplement formatter and said subsequent preamble supplement formatter repeatedly provide said first permutation and said mutually exclusive further permutations during an additional period of time; and a MIMO receiver that has M receive antennas, M being at least two, and employs said set and said permutations of said set to determine channel estimates.

14. The system as recited in claim 13 wherein said first preamble supplement is a training sequence and said second preamble supplement is a null.

15. The system as recited in claim 13 wherein said set temporally follows a signal field.

16. The system as recited in claim 13 wherein said initial time interval and said subsequent time intervals are contiguous.

17. The system as recited in claim 13 wherein repeated provisions of said initial permutation and said mutually exclusive further permutations allow said first permutation and said mutually exclusive further permutations to be averaged.

18. The system as recited in claim 13 wherein said additional period of time is based on an integer multiple of said plurality of N transmit antennas.

* * * * *